Patented Dec. 10, 1940

2,224,144

UNITED STATES PATENT OFFICE 2,224,144

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application May 9, 1939, Serial No. 272,682

7 Claims. (Cl. 260—152)

This invention relates to the preparation of a new series of azo dyes. More particularly it relates to aryl azo compounds containing at least three sulfonamide groups on the same benzene nucleus.

We have discovered that a valuable series of aryl azo dyes suitable for the coloration of organic derivatives of cellulose including cellulose acetate, can be prepared by diazotizing an amine having the formula:

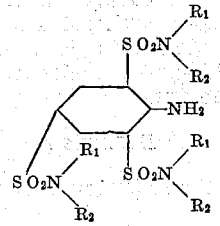

wherein $R_1$ and $R_2$ represent members selected from the group consisting of hydrogen, substituted or unsubstituted alkyl, alkylene, aryl, heterocyclic, and hydroaromatic groups, and coupling with suitable aromatic, hydroaromatic and heterocyclic groups.

The structure of our new azo dyes is represented by the general formula:

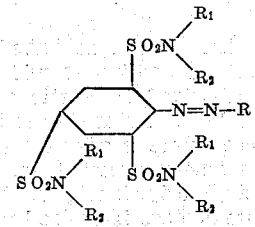

wherein $R_1$ and $R_2$ have the meanings above given, and R represents aromatic, hydroaromatic, and heterocyclic nuclei, and also their derivatives containing the group

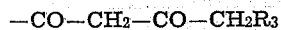

wherein $R_3$ represents hydrogen, alkyl, alkylene, heterocyclic, and aryl groups, as a nuclear substituent.

It is an object therefore of our invention to prepare azo dyes of the class above described and to color cellulose organic derivatives including cellulose acetate in the form of threads, yarns, filaments and fabric materials therewith.

The intermediates used as the diazo components are prepared by reacting chlorosulfonic acid with aniline or suitably substituted anilines, and amidating by known methods to the corresponding aniline sulfonamides.

The following examples illustrate the preparation of the azo compounds of our invention.

Example 1

(A) 33 grams of 2,4,6-trisulfonamidoaniline are dissolved in 220 c. cs. of hot acetic acid and cooled rapidly to room temperature.

(B) 7 grams of sodium nitrate are dissolved in 53 c. cs. of sulfuric acid at 10–15° C., the solution warmed to 70° C., and then cooled to 10–15° C.

The diazotization reaction is carried out by adding solution (A) to solution (B) over a period of 30–45 minutes, meanwhile maintaining a temperature of 10–15° C., and stirring continuously. When the addition is complete, the mixture is further stirred at room temperature for one hour, and 1 gram of urea added.

The coupling reaction is accomplished by dissolving 14 grams of dimethyldihydroresorcinol in an excess of 2 normal aqueous sodium hydroxide, adding ice, and then stirring into this mixture the diazo solution prepared above. When coupling is completed, the mixture is made acid to litmus with acetic acid and the dye filtered out, washed and dried. Cellulose acetate is colored yellow shades from aqueous suspensions of the dye. The dye compound has the formula:

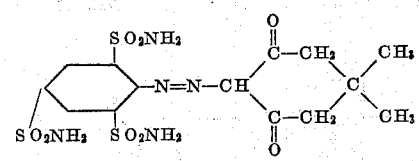

In place of dimethyldihydroresorcinol, there may be used an equivalent amount of 1-phenyl-3-methyl-5-pyrazolone, barbituric acid, p-cresol, and similar types of compounds.

Example 2

36.4 grams of 2,4,6-sym. trimethylsulfonamide aniline are diazotized following the procedure described in Example 1. 12.1 grams of dimethylaniline are dissolved in cold dilute hydrochloric acid and the diazo solution added. After standing for a short time, the mixture is made neutral to Congo red indicator with sodium acetate. When the coupling is complete, the dye is filtered out, washed and dried. Cellulose acetate is colored wine-red shades from aqueous suspensions of the dye.

The dye compound has the formula:

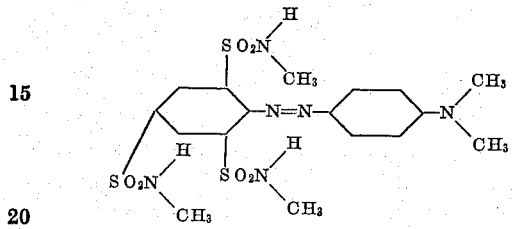

In place of dimethylaniline there may be used dibutylaniline, ethyl amyl-m-toluidine, cetyl cresidine and the like compounds.

*Example 3*

42.8 grams of 2,4,6-hexamethyl sulfonamidoaniline are diazotized following the procedure described in Example 1. 16.9 grams of diphenylamine are dissolved in acetic acid, the diazo solution added, and after standing for a short time, the mixture is made neutral to Congo red indicator with sodium acetate. The dye thus obtained colors cellulose acetate brownish-red shades from aqueous suspensions of the dye. The dye compound has the formula:

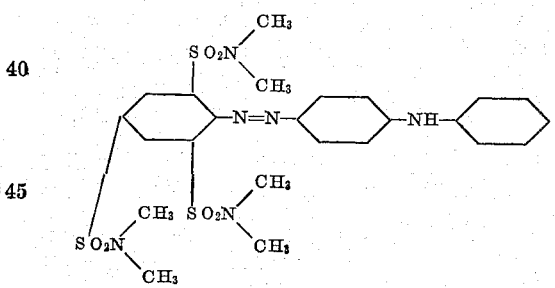

*Example 4*

0.1 mole of 2,4,6-sym. triphenyl sulfonamidoaniline is diazotized following the procedure described in Example 1. 18.1 grams of glyceryl-m-toluidine are dissolved in cold acetic acid and the coupling carried out in the manner described in Example 3. Cellulose acetate is colored violet shades from aqueous suspensions of the dye.

The dye compound has the formula:

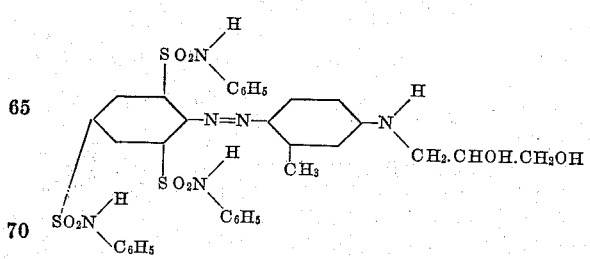

*Example 5*

0.1 mole of 2,4,6-sym. tri-β-hydroxyethyl sulfonamidoaniline are diazotized and coupled with 22.3 grams of butyl-β-hydroxyethyl-m-anisidine following the procedure of Example 3. Cellulose acetate is colored violet shades from aqueous suspensions of the dye.

The dye compound has the formula:

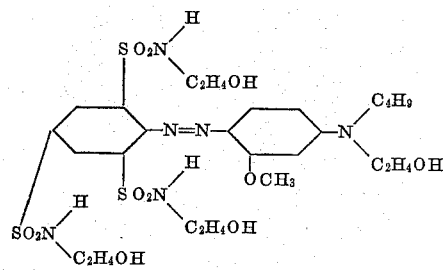

*Example 6*

0.1 mole of the following amino compound:

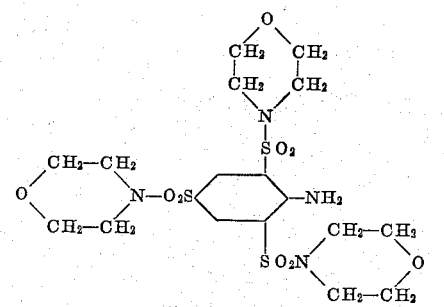

is diazotized and coupled with 23.3 grams of 1-glycerylamino-5-naphthol following the procedure described in Example 3. Cellulose acetate is colored bluish-green shades from aqueous suspensions of the dye.

*Example 7*

0.1 mole of the following amino compound:

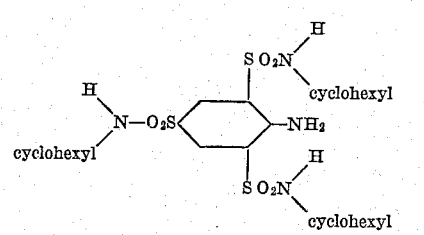

is diazotized in the manner described in Example 1. 32.3 grams of sodium-β-sulfoethyl butyl cresidine are dissolved in acetic acid and the diazo solution added. After standing for a short time, sodium carbonate is added until Congo red indicator is no longer turned blue. When coupling is complete, the dye is salted out, filtered and dried. Cellulose acetate is colored purple shades from aqueous suspensions of the dye.

In place of sodium-β-sufoethyl butyl cresidine, there may be used sodium-β-sulfatoethyl butyl cresidine, sodium phosphatoethyl butyl cresidine.

The invention is further illustrated by reference to the following table. The compound listed under the heading "Amine" is diazotized and coupled with an equivalent quantity of the specified compound in the column entitled "Coupling component," the dye resulting therefrom coloring cellulose acetate the shades of color designated under the heading "Shade on cellulose acetate."

| Amine | Coupling component | Shade on cellulose acetate |
|---|---|---|
| 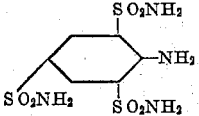 | (1) Barbituric acid | Yellow. |
| Do | (2) Dimethyl dihydroresorcinol | Do. |
| Do | (3) 3-methyl-5-pyrazolone | Do. |
| Do | (4) 1-phenyl-3-methyl-5-pyrazolone | Orange-yellow. |
| Do | (5) p-Cresol | Yellow. |
| Do | (6) Diphenylamine | Brownish-red. |
| Do | (7) Dimethylaniline | Wine red. |
| Do | (8) Dibutylaniline | Do. |
| Do | (9) Ethyl butyl-m-toluidine | Reddish-purple. |
| Do | (10) Ethyl cresidine | Purple. |
| Do | (11) Glyceryl cresidine | Purplish-blue. |
| Do | (12) Di-β-hydroxyethyl cresidine | Do. |
| Do | (13) 2,5-dialkoxy-glycerylaniline | Do. |
| Do | (14) Glyceryl-α-naphthylamine | Reddish-blue. |
| Do | (15) 1-amino-5-naphthol | Blue. |
| Do | (16) 1-β-hydroxyethylamino-5-naphthol | Blue-green. |
| 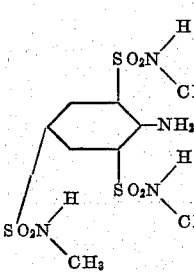 | Couplers 1-16 | Same colors as above. |
| 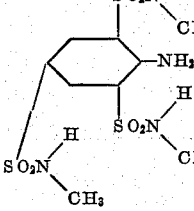 | Couplers 1-16 | Do. |
| 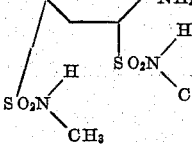 | Couplers 1-16 | Do. |
| 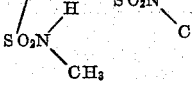 | Couplers 1-16 | Do. |
|  | Couplers 1-16 | Do. |

The method of applying the above described dyes to textile materials depends upon the individual solubility characteristics of each dye. If the dye is water-soluble, it may be used for the direct coloration of organic derivatives of cellulose, particularly cellulose acetate in the form of threads, yarns, filaments and fabric materials without the necessity of employing a dispersing or solubilizing agent. The dyeing operation will be conducted in accordance with the usual dyeing practice, salt being added if desired to facilitate exhaustion of the dye bath. For a more detailed description as to how the water-soluble azo dyes of our invention may be employed for the coloration of textile materials, reference may be had to our U. S. Patent No. 2,107,898, issued February 8, 1938. If the dye is water-insoluble, it may be applied in the form of an aqueous suspension with a suitable dispersing agent. For example, the dye compound is finely ground with soap or oleyl glyceryl sulfate and the resulting paste is dispersed in water. The dispersion is then heated to a temperature approximately 45–55° C. and the cellulose acetate silk in the form of threads or fabric is immersed in the solution, after which the temperature is gradually raised to 80–85° C., and maintained at this point for several hours. Sodium chloride may be added if desired during the dyeing operation to promote exhaustion of the dye bath. Upon completion of the dyeing operation, the cellulose acetate silk is removed, washed with soap, rinsed and dried.

Typical organic derivatives of cellulose includes the hydrolyzed as well as the unhydrolyzed cellulose organic acid esters and cellulose mixed organic esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

The expression "alkyl" as used throughout the specification and claims is intended to include unsubstituted alkyl groups belonging to the series $C_nH_{2n+1}$ such as methyl, ethyl, propyl, butyl, etc., as well as substituted alkyl groups such as the mono- and polyhydroxy alkyls, and the etherified and esterified derivatives of mono- and polyhydroxy- alkyls.

We claim:

1. The azo compounds having the general formula:

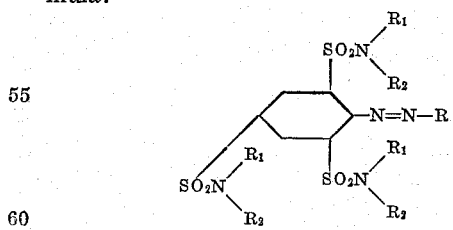

wherein R represents a member selected from the group consisting of an aryl nucleus of the benzene series, an aryl nucleus of the naphthalene series, and a heterocyclic nucleus, and $R_1$ and $R_2$ represent members selected from the group consisting of hydrogen, alkyl, cycloalkyl, and an aryl group of the benzene series, and

also represents

2. The azo compounds having the general formula:

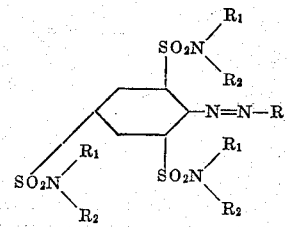

wherein R represents an aryl nucleus of the benzene series, and $R_1$ and $R_2$ represent members selected from the group consisting of hydrogen, alkyl, cycloalkyl, and an aryl group of the benzene series, and

also represents

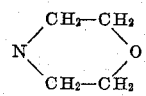

3. The azo compounds having the general formula:

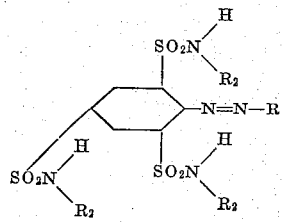

wherein R represents an aryl nucleus of the benzene series, and $R_2$ represents a member selected from the group consisting of hydrogen, an alkyl group of the benzene series, a cycloalkyl group, and an aryl group.

4. The azo compounds having the general formula:

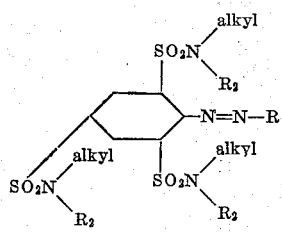

wherein R represents an aryl nucleus of the benzene series, and $R_2$ represents a member selected from the group consisting of hydrogen, an alkyl group of the benzene series, a cycloalkyl group, and an aryl group.

5. The azo compounds having the general formula:

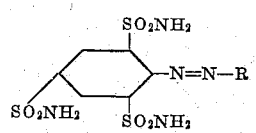

wherein R represents an aryl nucleus of the benzene series, and wherein one or more of the hydrogens of the amine groups are substituted by alkyl groups.

6. The azo compounds having the general formula:

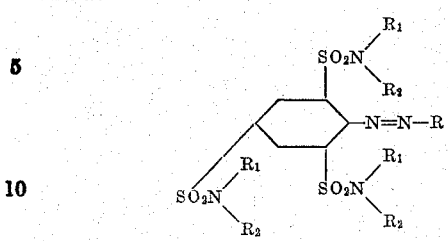

wherein R represents a heterocyclic nucleus, and $R_1$ and $R_2$ represent members selected from the group consisting of hydrogen, alkyl, cycloalkyl, and an aryl group of the benzene series, and

also represents

7. Material made of or containing an organic derivative of cellulose is colored with a dye selected from the class of azo compounds having the general formula:

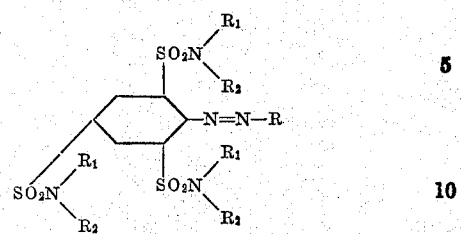

wherein R is a member selected from the group consisting of an aryl nucleus of the benzene series, an aryl nucleus of the naphthalene series, and a heterocyclic nucleus, and $R_1$ and $R_2$ represent members selected from the group consisting of hydrogen, alkyl, cycloalkyl, and an aryl group of the benzene series, and

also represents

JAMES G. McNALLY.
JOSEPH B. DICKEY.

CERTIFICATE OF CORRECTION.

Patent No. 2,224,144. December 10, 1940.

JOSEPH B. DICKEY, ET AL.

It is hereby certified that error appears in the printed specification of the above numbered patent requiring correction as follows: Page 4, second column, lines 44 and 62, claims 3 and 4 respectively, strike out the words "of the benzene series" and insert the same after "group" second occurrence, lines 45 and 63, same claims; and that the said Letters Patent should be read with this correction therein that the same may conform to the record of the case in the Patent Office.

Signed and sealed this 4th day of March, A. D. 1941.

(Seal)

Henry Van Arsdale,
Acting Commissioner of Patents.